United States Patent
Soeta et al.

(10) Patent No.: US 6,525,713 B1
(45) Date of Patent: Feb. 25, 2003

(54) COORDINATE INPUT DEVICE CAPABLE OF INPUTTING Z-COORDINATE OF IMAGE OBJECT

(75) Inventors: Kaoru Soeta, Kanagawa-ken (JP); Hiroki Oba, Miyagi-ken (JP); Tatsuaki Kawase, Miyagi-ken (JP)

(73) Assignee: Alps Electric Co., Ltd., Tokyo (JP)

( * ) Notice: Subject to any disclaimer, the term of this patent is extended or adjusted under 35 U.S.C. 154(b) by 0 days.

(21) Appl. No.: 09/568,175

(22) Filed: May 9, 2000

(30) Foreign Application Priority Data

May 10, 1999 (JP) .......................................... 11-128698

(51) Int. Cl.[7] .............................. G09G 5/08; G06F 3/033
(52) U.S. Cl. ...................... 345/160; 345/163; 345/164; 345/159; 345/684
(58) Field of Search .................................. 345/163–169, 345/160, 156–158, 159, 786, 784, 684; 273/148 B; 463/37–38; 455/566; 200/5 R, 11 R

(56) References Cited

U.S. PATENT DOCUMENTS

| | | | | |
|---|---|---|---|---|
| 4,866,542 A | * | 9/1989 | Shimada et al. | 360/10.3 |
| 4,891,632 A | * | 1/1990 | Chang | 340/710 |
| 5,187,468 A | * | 2/1993 | Garthwaite et al. | 340/709 |
| 5,473,344 A | * | 12/1995 | Bacon et al. | 345/163 |
| 5,712,725 A | * | 1/1998 | Faltermeier et al. | 345/165 |
| 5,771,038 A | * | 6/1998 | Wang | 345/163 |
| 5,917,473 A | * | 6/1999 | Yeh | 345/163 |
| 5,987,336 A | * | 11/1999 | Sudo et al. | 455/566 |
| 6,115,029 A | * | 9/2000 | Jaaskelainen, Jr. et al. | 345/163 |

FOREIGN PATENT DOCUMENTS

| | | | | |
|---|---|---|---|---|
| JP | 407092939 | * | 4/1995 | ............ G09G/5/00 |
| JP | 10275053 | | 10/1998 | |

* cited by examiner

Primary Examiner—Lun-Yi Lao
(74) Attorney, Agent, or Firm—Brinks Hofer Gilson & Lione

(57) ABSTRACT

A cordinate input device is provided in which z-coordinate of an image object and a command to scroll the image can be inputted, a positive manipulation feeling can be obtained when changing scrolling speed (the amount of scrolling) of an image, and an accurate scrolling adjustment is enabled. The coordinate input device includes a casing, an (x, y) coordinate information input unit 6, push-button switches 7 and 8 for inputting the (x, y) coordinate information detected by the (x, y) coordinate information input unit 6, and an input manipulation unit for inputting z-coordinate information and image scrolling information in addition to the (x, y) coordinate information. The input manipulation unit includes a jog/shuttle switch 9 having a jog dial and a shuttle dial coaxially disposed.

4 Claims, 3 Drawing Sheets

COORDINATE INPUT DEVICE CAPABLE OF INPUTTING Z-COORDINATE OF IMAGE OBJECT

BACKGROUND OF THE INVENTION

1. Field of the Invention

The present invention relates to coordinate input devices used in computers or the like. In particular, the invention relates to an input device to input coordinate information and image scroll information on a display monitor.

2. Description of the Related Art

Regarding input devices for computers, coordinate input devices called "pointing device" such as a mouse and a track ball are generally used, besides keyboards, in order to facilitate inputting/commanding operations.

Such a known coordinate input device which includes an inputting operation unit having an automatic-return sliding switch disposed on the top or at the side of a casing can input a z-coordinate of an object and a command for image scrolling. The configuration of the known coordinate input device is shown in FIG. 4 and FIG. 5. FIG. 4 is a perspective view of a mouse 21 which is a coordinate input device, and FIG. 5 is a side view of the same.

The mouse 21 shown in FIGS. 4 and 5 includes a hollow casing 22, a ball 23, a part of which is exposed at the bottom thereof, in the casing 22, an (x, y) coordinate input unit (not shown) having a rotation detector, such as a rotary encoder, for detecting the rotation of the ball 23 and a pair of push-button switches 24 and 25.

When the mouse 21 is moved on a flat surface, coordinate information is inputted by the (x, y) coordinate input unit to move an image object such as a cursor on an X-Y plane. When the push-button switches 24 and 25 are pressed or released, subsequent command information is given to the computer.

A sliding-switch-type input unit 26 is provided on the upper face of the casing 22 between the pair of push-button switches 24 and 25. The sliding-switch-type input unit 26 includes a sliding switch 27 having a knob 27a which protrudes upwardly through a rectangular opening 26a. The sliding switch 27 moves longitudinally in the rectangular opening 26a. The sliding switch 27 is an automatic return switch which automatically returns, when released, to an original position 26b (an intermediate position) by being urged by a return spring (not shown).

When the sliding switch 27 is moved in the longitudinal directions, the direction of movement and the amount of movement are detected, and are converted to information to be inputted to the computer as z-coordinate information to move an image object in the direction perpendicular to the X-Y plane or to scroll the image.

Using the above described coordinate input device, three-dimensional coordinate information on the x-axis, y-axis, and z-axis can be inputted to a computer.

The image on a display can be scrolled in the vertical directions by moving the sliding switch 27 in the longitudinal direction, and the image can be scrolled in the transverse direction on the display by pressing keys on the keyboard.

The scrolling speed and the amount of scrolling can be varied by changing the speed and the amount of movement of the sliding switch 27, respectively.

In the known coordinate input device, a problem has been found in that the user is likely to become fatigued, thereby making operation tedious and deteriorating the scrolling-control accuracy when the control of the amount of scrolling is repeatedly performed in an operation such as an image information editing operation. This problem is caused by the fact that the repeated control operation of the amount of scrolling is performed depending on the perception and manual manipulation by individual users, in which the amount of scrolling and the scrolling speed are controlled by controlling the amount and speed of movement of the sliding switch 27.

SUMMARY OF THE INVENTION

Accordingly, it is an object of the present invention to provide a coordinate input device in which the input of the z-coordinate of image objects and the command to scroll the image can be performed, and positive operational feeling can be obtained when controlling the speed and amount of image scrolling, thereby enabling accurate controlling of scrolling.

To this end, according to an aspect of the present invention, a coordinate input device comprises a casing; an (x, y) coordinate information input unit rotatably supported in the casing; a push-button switch for inputting (x, y) coordinate information detected by the (x, y) coordinate information input unit; and an input manipulation unit for inputting z-coordinate information and image scrolling information in addition to the (x, y) coordinate information. In the coordinate input device, the input manipulation unit includes a jog/shuttle switch having a jog switch unit and a shuttle switch unit disposed coaxially.

The jog switch unit and the shuttle switch unit of the jog/shuttle switch may be supported protruding from a side of the casing, and may be disposed overlapping each other at the side of the casing so as to be accessible from one direction.

The casing may be formed in a hollow shape, and may be provided with the push-button switch at one side of the casing and the jog/shuttle switch at the other side of the casing.

According to the invention, the (x, y) coordinate information input unit supported in the casing may include a rotatable ball, a part of which is exposed at the bottom of the casing, and a rotation detector for detecting a rotational state of the ball.

DESCRIPTION OF THE PREFERRED EMBODIMENT

Figure 1:
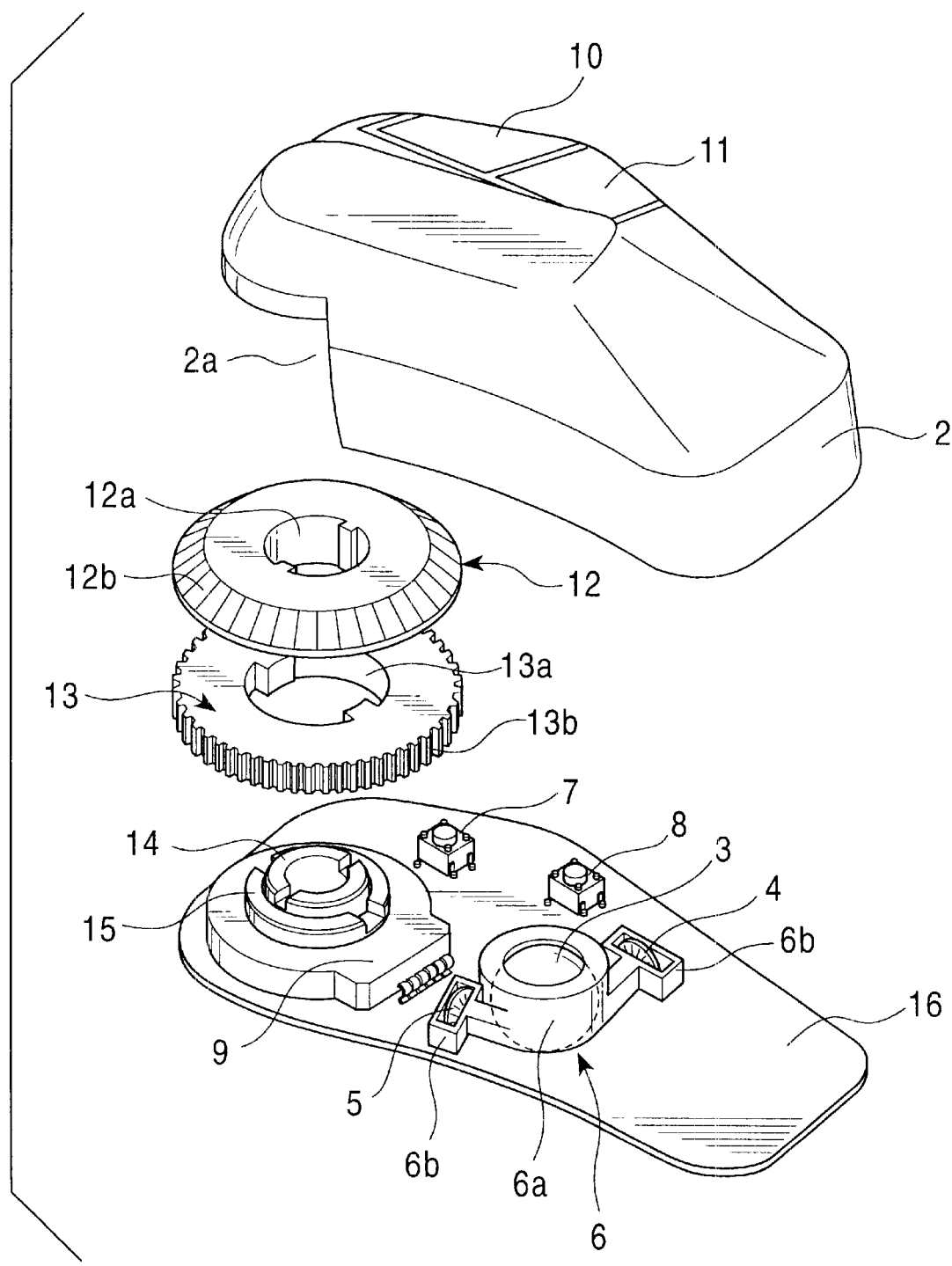
FIG. 1 is an exploded perspective view of a coordinate input device according to an embodiment of the present invention.
Figure 2:
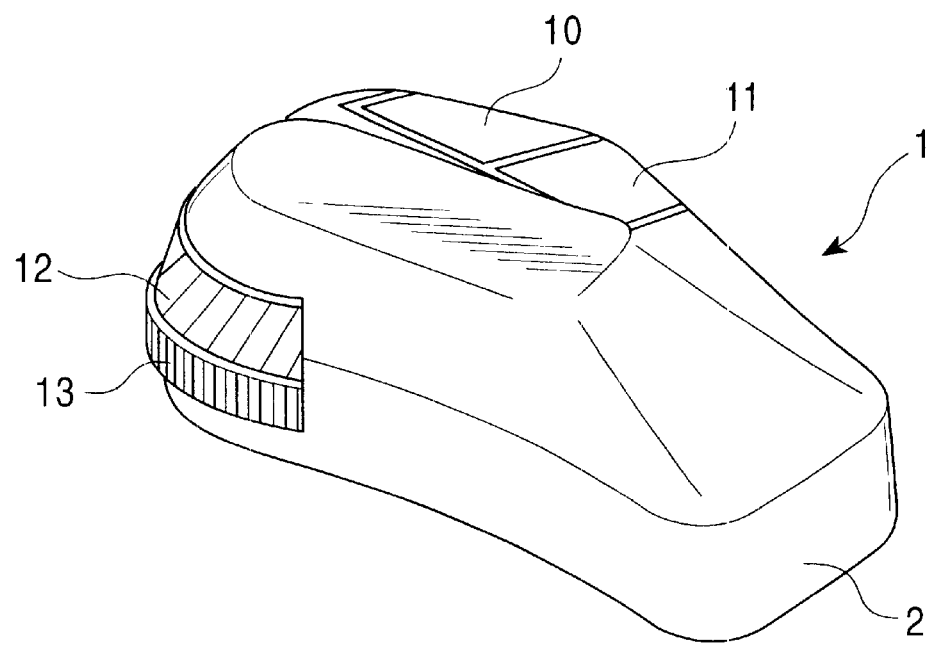
FIG. 2 is a perspective view of the assembled coordinate input device shown in FIG. 1 according to the embodiment of the invention.

An embodiment of a coordinate input device according to the present invention is described below with reference to FIGS. 1 to 3. FIG. 1 is an exploded perspective view of a mouse 1 which is the coordinate input device according to the invention. FIG. 2 is a perspective view of the mouse, and FIG. 3 is a plan view of the same.

Figure 3:
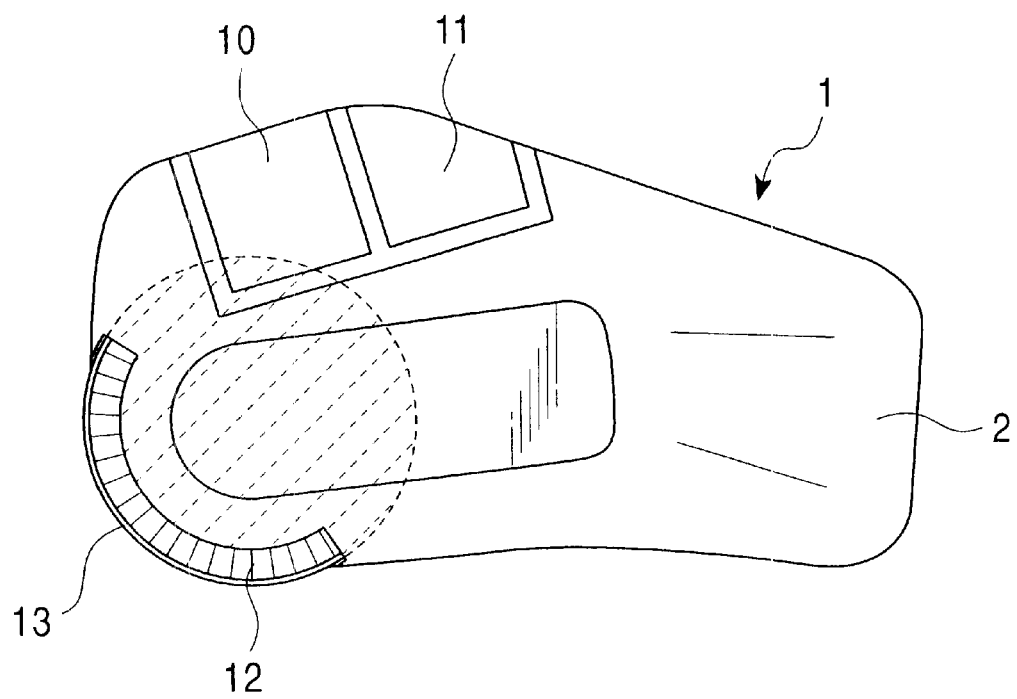
FIG. 3 is a plan view of the coordinate input device shown in FIG. 2 according to the embodiment of the invention.
Figure 4:
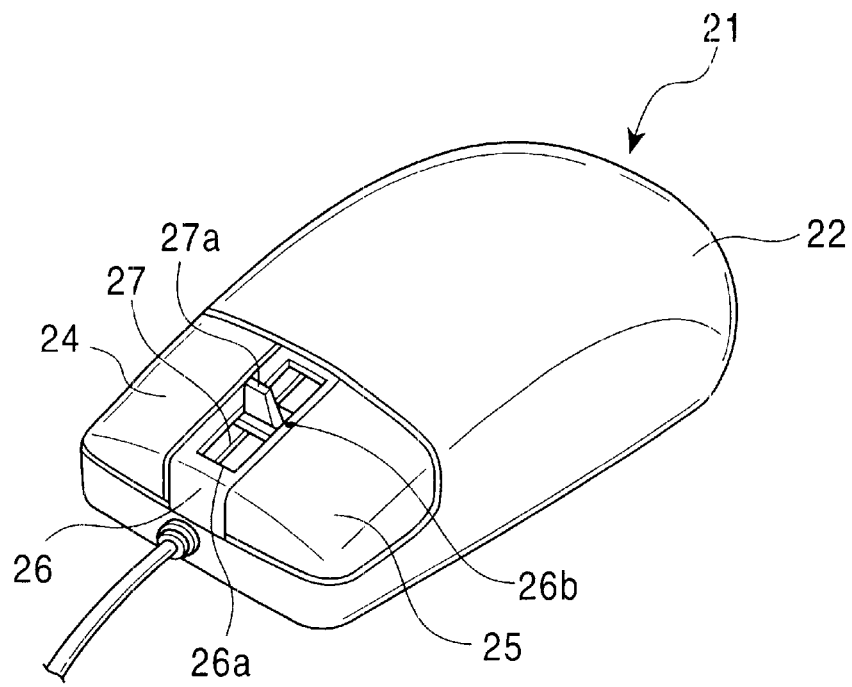
FIG. 4 is a perspective view of a mouse which is a known coordinate input device.
Figure 5:
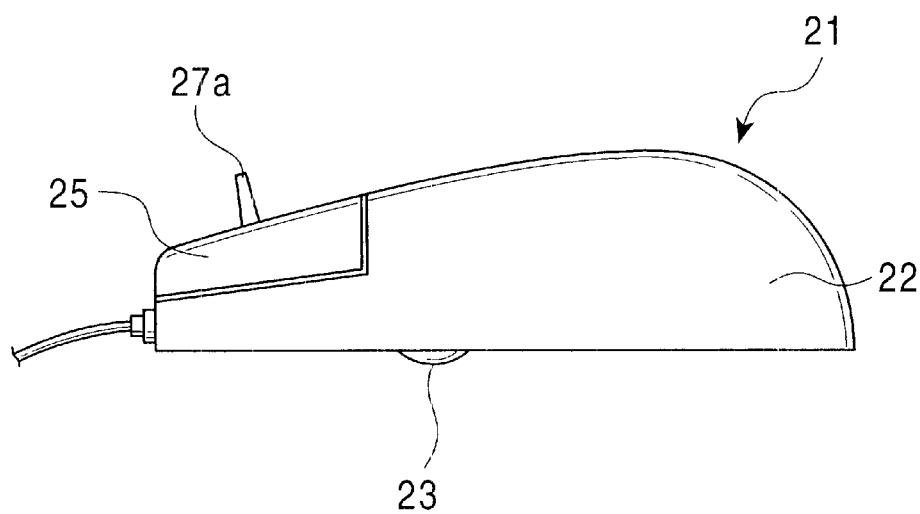
FIG. 5 is a side view of the mouse shown in FIG. 4 which is a known coordinate input device.

The mouse 1 shown in FIGS. 1 to 3 includes a hollow casing 2 having a size suitable to be held in a hand of the user, and a ball 3 rotatably disposed in the casing 2, a part of the ball 3 being exposed at the bottom of the casing 2. The mouse 1 also includes an (x, y) coordinate information input unit 6 having rotation detectors, such as rotary encoders 4 and 5, for detecting a rotational state (rotational speed, rotational direction, etc.) of the ball 3, a pair of push-button switches 7 and 8, and a jog/shuttle switch 9 for inputting z-coordinate information to move an image object in a direction perpendicular to the X-Y plane and a command for scrolling the image.

The casing 2 made of a molded material such as a synthetic resin has an opening at a lower part thereof. The casing 2 is provided with the pair of buttons 10 and 11 on the upper surface of the casing 2 at one side thereof for actuating the push-button switches 7 and 8, respectively, and is provided with an opening 2a at the other side thereof through which a jog dial 12 and a shuttle dial 13 for actuating the jog/shuttle switch 9 are exposed.

The (x, y) coordinate information input unit 6 is provided at the central part of the casing 2 with a ball-supporting unit 6a for rotatably supporting the ball 3, and rotation detectors 6b including, for example, the rotary encoders 4 and 5 which extend from the ball-supporting unit 6a in directions perpendicular to each other.

The push-button switches 7 and 8 are tactile-type push-button switches including therein movable points (not shown) made of a metallic resilient material. The push-button switches 7 and 8 are disposed under the buttons 10 and 11, respectively.

The jog/shuttle switch 9 is a combined-control-type switch including a jog switch unit (not shown) and a shuttle switch unit (not shown) which are disposed coaxially on the rotational axis of the jog/shuttle switch 9.

The jog/shuttle switch 9 is a rotary switch which generates and transmits pulse signals in accordance with the dialing operation of the jog dial 12 or the shuttle dial 13. The jog switch unit continuously outputs pulse signals while the jog dial 12 is rotated. A small amount of image transfer is controlled by using the pulse signals outputted according to the rotational speed of the jog dial 12. The shuttle switch unit outputs pulse signals in accordance with the rotational angle and the rotational direction of the shuttle dial 13, which are used as information for a large amount of image transfer.

The jog dial 12 is made of a molded material such as a synthetic resin, and is fixed to an end of a rotary manipulator 14 of the jog switch unit. The jog dial 12 is provided with a mating hole 12a at the center thereof to mate with the rotary manipulator 14 of the jog switch unit. The periphery of the jog dial 12 is tapered to form a manipulating face 12b. The tapered surface is provided with grooves in a bezel-like form so as to facilitate the manipulation.

The shuttle dial 13 is made of a molded material such as a synthetic resin, and is fixed to an end of a rotary manipulator 15 of the shuttle switch unit. The shuttle dial 13 is provided with a mating hole 13a at the center thereof to mate with the rotary manipulator 15 of the shuttle switch unit. The peripheral surface, which is a manipulating face 13b, is parallel to the rotational axis of the shuttle dial 13. The manipulating face 13b is provided with grooves in a shape different from those of the jog dial 12, for easy manipulation.

The casing 2 is provided with a planar cover 16 for covering the opening at the lower part of the casing 2, the cover 16 being made of a molded material such as a synthetic resin. The cover 16 is provided to have the (x, y) coordinate information input unit 6 including the ball 3, the rotary encoders 4 and 5, the push-button switches 7 and 8, and the jog/shuttle switch 9 mounted thereon.

The operation of the above-described mouse 1 which is the coordinate input device according to the present invention is described as follows.

When the mouse 1 is moved on a flat surface so as to rotate the ball 3, the (x, y) coordinate information input unit 6 inputs (x, y) coordinate information for moving an image object such as a cursor on a display monitor (not shown) connected to a computer. When the image object moves to a desired position in the display, the push-button switches 7 and 8 are switched on or off by depressing or releasing the button 10 and 11, respectively, thereby outputting a subsequent command to the computer.

Z-coordinate information for moving the image object in a direction perpendicular to the X-Y plane and a command to scroll the image object vertically and transversely are inputted by manipulating the jog/shuttle switch 9.

In this case, the rotational direction of the jog/shuttle switch 9 and the distance (the number of pulses of the rotation) are detected, and the result is inputted to the computer as information for moving the image object in a direction perpendicular to the X-Y plane and as information to scroll the image object.

According to the embodiment described above, the buttons 10 and 11 are manipulated with the index finger and the middle finger of a right hand, respectively, as the buttons 10 and 11 are disposed on the upper face at the right side of the casing 2. The jog dial 12 and the shuttle dial 13 of the jog/shuttle switch 9 are manipulated with the thumb of the right hand as the jog/shuttle switch 9 is disposed at the left side of the casing 2. Maneuverability and accuracy in manipulation of the jog/shuttle switch 9, which serves for detecting information to be inputted to a computer, such as z-coordinate information for moving the image object in a direction perpendicular to the X-Y plane and information for scrolling the image, are required.

According to the embodiment of the present invention, the jog dial 12 and the shuttle dial 13 of the jog/shuttle switch 9 protrude from the side of the casing 2, overlapping each other in an opening 2a at the side of the casing 2 so that the access thereto from one direction is enabled. With this arrangement, the input of desired information can be performed with just the thumb of a hand holding the mouse 1 within a narrow moving range of the thumb, and the device can be reduced in size in the width direction.

With the above-described arrangement, switch selection can be easily performed, in which the jog switch unit is selected when a small amount of image transfer is required, and the shuttle switch unit is selected when a large amount of image transfer is required in the information to be inputted to the computer, whereby the manipulation is simple and the scrolling adjustment can be accurately performed.

According to the embodiment, a mouse is described as a coordinate input device. However, the present invention is not limited to the mouse, and it may be applied to any other coordinate input device in which a function of inputting information such as z-coordinate information and image scrolling information is added to the function of inputting (x, y) coordinate information by a mechanism such as a track ball.

According to the present invention, the coordinate input device includes an input manipulation unit for inputting z-coordinate information and image scrolling information in addition to the (x, y) coordinate information. By virtue of the input manipulation unit which includes a jog/shuttle switch having a jog switch unit and a shuttle switch unit disposed coaxially on the rotational axis, the jog switch unit for a small amount of image transfer or the shuttle unit for a large amount of image transfer can be selected as needed, thereby providing a positive manipulation feeling, simple operation, and accurate scrolling adjustment.

A jog dial and a shuttle dial of the jog/shuttle switch are exposed at a side of a casing, and are disposed overlapping each other at the side of the casing so as to be accessible from one direction, whereby the input of desired information can be performed with a thumb in a limited moving range thereof, and the device can be reduced in size.

The casing is formed in a hollow shape, and is provided with switch buttons on the upper face of the casing at one side thereof and the jog/shuttle switch at the other side of the casing. The device can be stably held and operated by one hand, and is manipulated with the thumb, the index finger, and the middle finger.

An (x, y) coordinate information input unit held in the casing includes a rotatable ball, a part of which is disposed to be exposed at the bottom of the casing, and a rotation detector for detecting a rotating state of the ball. With this relatively simple arrangement, (x, y) coordinate information, coordinate information on the z-axis perpendicular to the X-Y plane, and image scrolling information can be inputted.

What is claimed is:

1. A coordinate information input device comprising:
   a casing;
   an (x, y) coordinate information input unit rotatably supported in the casing;
   a push-button switch for inputting (x, y) coordinate information detected by the (x, y) coordinate information input unit; and
   a jog/shuttle switch operating unit for inputting z-coordinate information or image scrolling information in addition to said (x,y) coordinate information;
   wherein the jog switch operating unit and the shuttle switch operating unit are disposed coaxially,
   wherein the jog switch operating unit is configured to control a small amount of image transfer and the shuttle switch operating unit is configured to control a large amount of image transfer.

2. A coordinate input device according to claim 1, wherein the jog switch unit and the shuttle switch unit of said jog/shuttle switch are supported protruding from a side of said casing, and are disposed overlapping each other at the side of said casing so as to be accessible from one direction.

3. A coordinate input device according to claim 1, wherein said casing is formed in a hollow shape, and is provided with said push-button switch at one side of said casing and said jog/shuttle switch at the other side of said casing.

4. A coordinate input device according to claim 1, wherein said (x, y) coordinate information input unit supported in said casing includes a rotatable ball, a part of which is exposed at the bottom of said casing, and a rotation detector for detecting a rotational state of the ball.

* * * * *